United States Patent
Tsai

Patent Number: 6,004,490
Date of Patent: Dec. 21, 1999

[54] METHOD OF USING AN IMPROVED CLAMPING UNIT IN AN INJECTION MOLDING MACHINE

[75] Inventor: Lang-Fu Tsai, Hsinchu, Taiwan

[73] Assignee: Industrial Technology Research Institute, Hsinchu, Taiwan

[21] Appl. No.: 08/518,911

[22] Filed: Aug. 24, 1995

Related U.S. Application Data

[60] Continuation-in-part of application No. 08/345,952, Nov. 28, 1994, abandoned, which is a division of application No. 08/087,923, Jul. 6, 1993, Pat. No. 5,370,524.

[51] Int. Cl.⁶ .................................................. B29C 45/64
[52] U.S. Cl. .................... 264/40.5; 264/328.1; 425/149; 425/150; 425/593; 425/451.6
[58] Field of Search ................................ 264/40.1, 40.5, 264/328.1, 328.11; 425/135, 149, 150, 589, 592, 593, 450.1, 451.5, 451.6, 167

[56] References Cited

U.S. PATENT DOCUMENTS

| | | |
|---|---|---|
| 5,045,253 | 9/1991 | Kamiguchi et al. ............... 425/593 |
| 5,052,908 | 10/1991 | Inaba et al. ........................ 425/593 |
| 5,059,365 | 10/1991 | Hertzer et al. ..................... 264/40.5 |
| 5,102,327 | 4/1992 | Reinhart ............................. 425/593 |
| 5,149,471 | 9/1992 | Catanzaro et al. ................ 264/40.5 |
| 5,279,778 | 1/1994 | Taira et al. ......................... 264/40.5 |
| 5,297,952 | 3/1994 | Leonhartsberger ................ 425/593 |
| 5,370,524 | 12/1994 | Liang et al. ........................ 425/593 |
| 5,511,963 | 4/1996 | Hehl ................................... 425/593 |
| 5,585,126 | 12/1996 | Heindl et al. ...................... 425/593 |

*Primary Examiner*—Jill L. Heitbrink
*Attorney, Agent, or Firm*—W. Wayne Liauh

[57] ABSTRACT

A clamping unit and method thereof, in which a servo-motor mounted on a rear platen is used for driving two ball screws with pre-load hydraulic cylinders so as to acuate the outward-bending toggle mechanism to provide mold-opening and mold-clamping functions; by using a limited space, a servo-motor mounted on the movable platen is used for driving a nut to turn so as to cause the screw and the ejector bar to be moved back and forth; finally, an electric motor on the rear, platen will drive a mold-adjusting mechanism, and a servo-motor mounted on the platen is also operated so as to complete the mold adjustment quickly and automatically.

3 Claims, 14 Drawing Sheets

METHOD OF USING AN IMPROVED CLAMPING UNIT IN AN INJECTION MOLDING MACHINE

This is a continuation-in-part application of application Ser. No. 08/345,952, now abandoned, which is a divisional application of application Ser. No. 08/087,923, now U.S. Pat. No. 5,370,524.

FIELD ON THE INVENTION

This invention relates to a clamping unit and method of using the same in an injection molding machine. More particularly, this invention relates to a mold-clamping unit, and method of using the same, which can facilitate a quick mold height adjustment and provide a balanced clamping force.

BACKGROUND OF THE INVENTION

Figure 1:
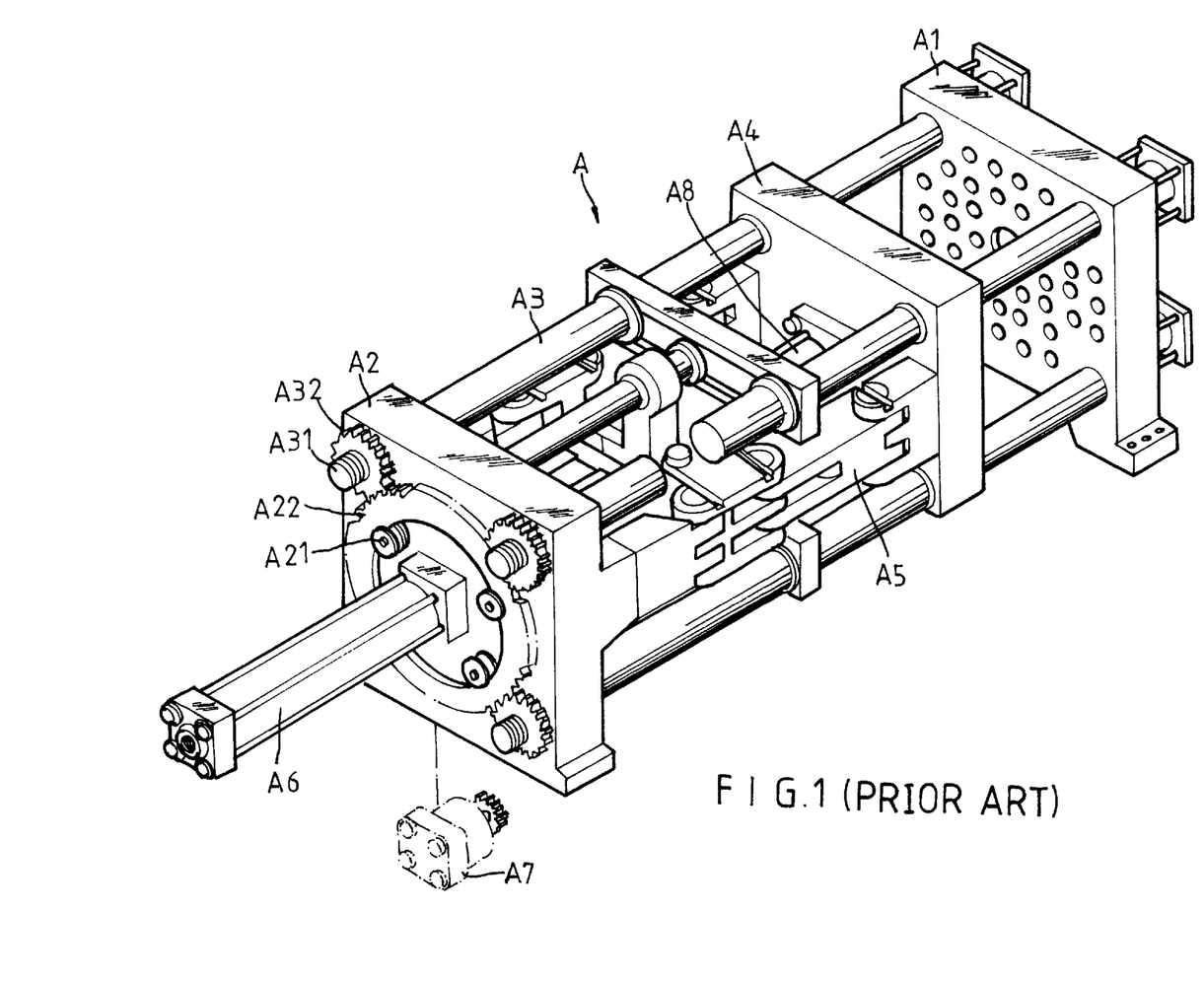
FIG. 1 is a perspective view of a clamping unit in a conventional injection molding machine.

Generally, a conventional injection molding machine comprises a machine base, a clamping unit, an injection unit and a hydraulic electric control system. The clamping unit A as shown in FIG. 1 includes a front platen A1, a rear platen A2, two pairs of tie bars A3 mounted in parallel to the four corners of the platens, and a movable platen A4 which can be moved along the tie bars. The movable platen A4 and the rear platen A2 are linked together by a set of inward-bending toggle mechanisms A5 which are driven by a hydraulic cylinder A6 so that the movable platen A4 can move forward or in reverse for mold-closing or mold-opening function. Since there are many kinds of mold heights, the rear platen A2 has to be adjusted from time to time to meet the requirement of mold heights in order to provide a suitable clamping force. Consequently, a mold-adjusting mechanism is installed on the rear platen A2. Each rear end of the tie bars A3 is provided with a trapezoidal thread A31 which is mounted with a nut gear A32; the rear platen A2 is mounted with several rollers A21 around which a ring-shaped gear A22 is mounted. The ring-shaped gear A22 is engaged with the nut gears A32; the ring-shaped gear A22 is driven by a hydraulic motor A7 fixed on the rear platen A2. When hydraulic motor A7 turns, the ring-shaped gear A22 will be revolved to cause the nut gears A32 to rotate, and then the nut gears A32 will move along the trapezoidal thread A31; simultaneously, the rear platen A2 will be driven to move so as to find a suitable space for the mold heights. An ejector assembly is driven with a thrusting-out hydraulic cylinder A8 to cause an ejector pin to move forwards or backwards so as to facilitate a demolding operation.

Figure 2:
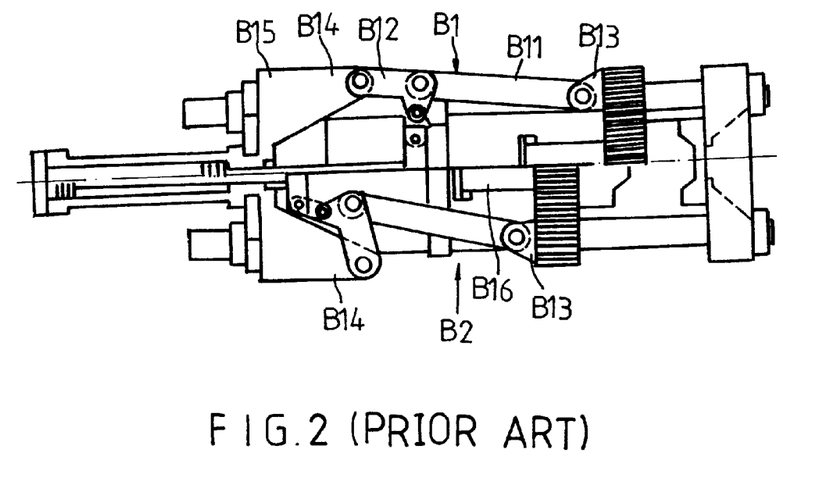
FIG. 2 is a view of a clamping unit, showing the mold-opening and the mold-clamping conditions for a conventional injection molding machine.
Figure 3:
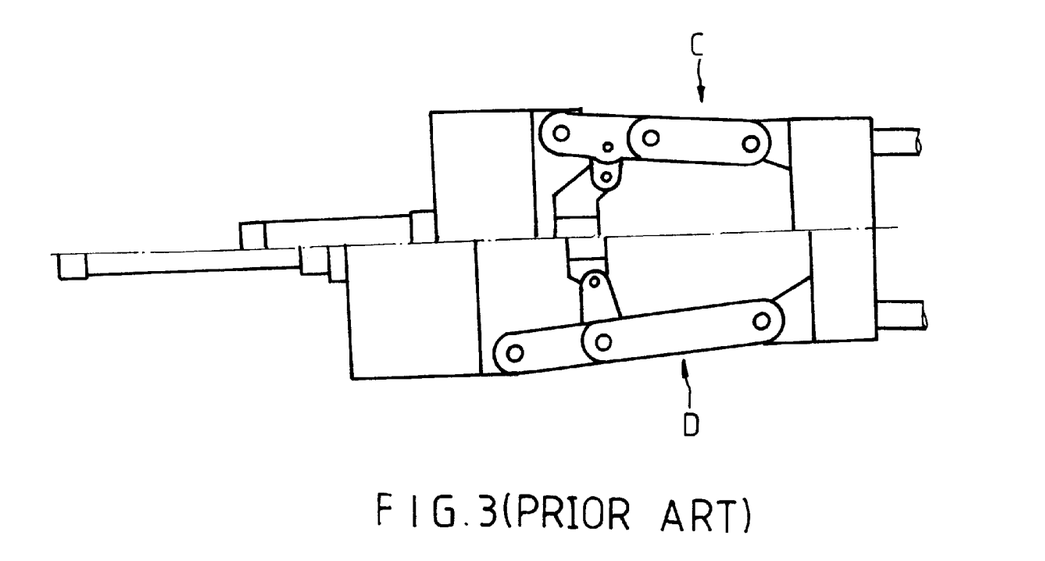
FIG. 3 illustrates a 5-point toggle linkage and 4-point toggle linkage of a clamping unit in a conventional injection molding machine.

In practice, the inward-bending toggle mechanism can provide a mold-closing B1 and a mold-opening B2 operation as shown in FIG. 2, in which the length of the link B12 is limited by the size of the rear platen B15; the length of the link B11 is also related with the space required by the ejector mechanism B16 so as to avoid any interference between them; therefore, the space arrangement of toggle linkages becomes very important. Otherwise, we can not take full advantage of this toggle mechanism. Moreover, since the link B13 and B14 must be located on the outer edge of the movable platen and the rear platen B15, the supporting point of the mechanism is on the outer edge, but the pressure of the movable platen is applied to the central part (i.e., the contact part with the mold); as a result, the mold board is subject to a greater deformation quantity, and then the quality of a product will be affected. Generally, a small type of injection molding machine is equipped with a 5-point toggle C (in FIG. 3). Under a similar opening distance of the movable platen (the movable platen stroke), the 5-point toggle would provide a smaller amplification value of mechanical force than that of a 4-point toggle D.

In the conventional injection molding machine, a hydraulic system is used as a driving power; the hydraulic system not only has the drawback of maintenance, but also has the disadvantage of positional control; further, the hydraulic pump would have noise, vibration and oil pollution, which would affect the working environment; in addition, when making automatic mold adjustment, the rear platen has to be-equipped with a sensor, and uses a two-division moving method or a statistic concept, and a trial-and-error method to find the mold heights. The aforesaid methods and procedures would spend a lot of time, and require a complex software and calculation operation. The ejector cylinder requires a considerable space, which would affect the design of the toggle mechanism and the space between the movable platen A4 and the rear platen A2.

Figure 12:
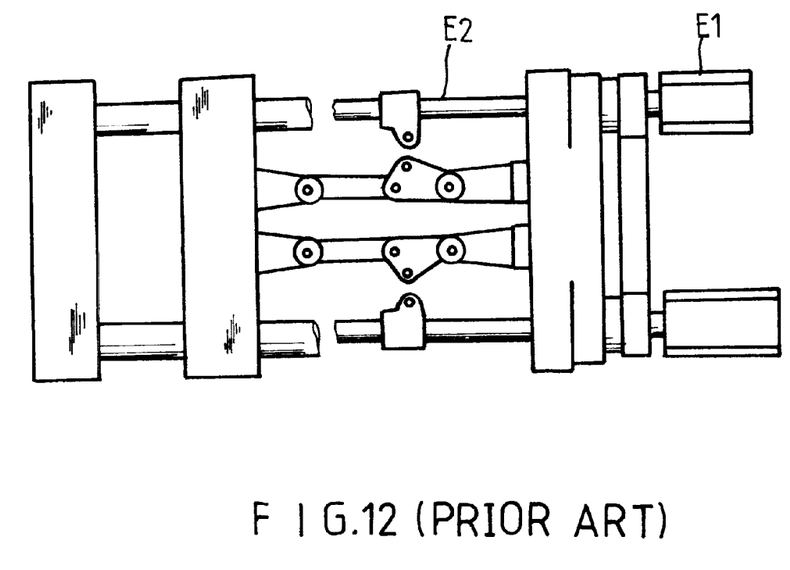
FIG. 12 is a plan view of a clamping unit in a conventional injection molding machine.
Figure 13:
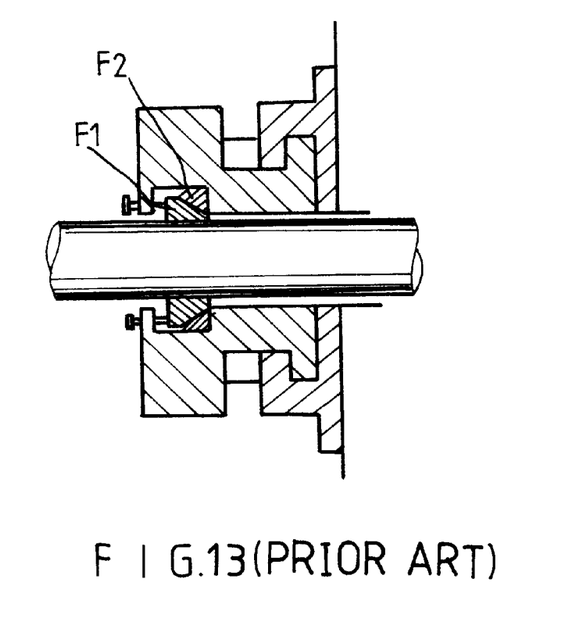
FIG. 13 is a fragmentary sectional view of the driving pulley and the wedge type connection members of a conventional clamping unit.

Moreover, the U.S. Pat. No. 5,052,908 (FIG. 12) employs two servo-motors E1 for driving ball screws E2 having different screw pitches in order to provide a quick and a slow mold-clamping functions, and to obtain a fully electrically-operated machine which can eliminate noise, vibration and oil pollution to working environment; however, the aforesaid apparatus still uses two servo-motors to clamp the mold, and some drawbacks remain. Another U.S. Pat. No. 4,938,682 (as shown in FIG. 13) uses a servo-motor to drive the clamping unit. This patent puts its emphasis on conic members F1 and F2 for mold-clamping so as to provide a balanced clamping force; however, such conic members are still unable to offer a better balanced result.

SUMMARY OF THE INVENTION

This invention relates to a clamping unit and method for an injection molding machine, and particularly to a mold-clamping unit and method thereof, which can quickly complete the mold heights adjustment, and can provide a balanced clamping force. The device comprises a servo-motor mounted on the rear platen to drive two ball screws with pre-load hydraulic cylinder to actuate two outward-bending toggle mechanism for providing mold-opening and mold-clamping functions. By using a limited space, a servo-motor mounted on the movable platen can actuate a nut to rotate for driving a ball screw and an ejector bar to move in a straight line so as to cause an ejector bar to move back and forth. The electric motor on the rear platen is used for driving the mold-adjusting mechanism, and a servo-motor mounted on the platen is also operated so as to complete the mold adjustment quickly and automatically. The present invention can eliminate the drawbacks a hydraulic-clamping system, including mold adjustment, positional control, energy consumption and maintenance. Furthermore, with this invention we can promote the quality and accuracy of products.

BRIEF DESCRIPTION OF THE DRAWINGS

FIG. 4-1 is a top view of a clamping unit according to the present invention, being in mold-opening condition.

FIG. 4-2 is a top view of a clamping unit according to the present invention, being in mold-clamping condition.

FIG. 6-1 is a front view of the clamping unit according to the present invention, showing a mold-opening condition.

FIG. 6-2 is a front view of the clamping unit according to the present invention, showing the mold-clamping condition.

DETAILED DESCRIPTION OF PREFERRED EMBODIMENT

Figure 5:
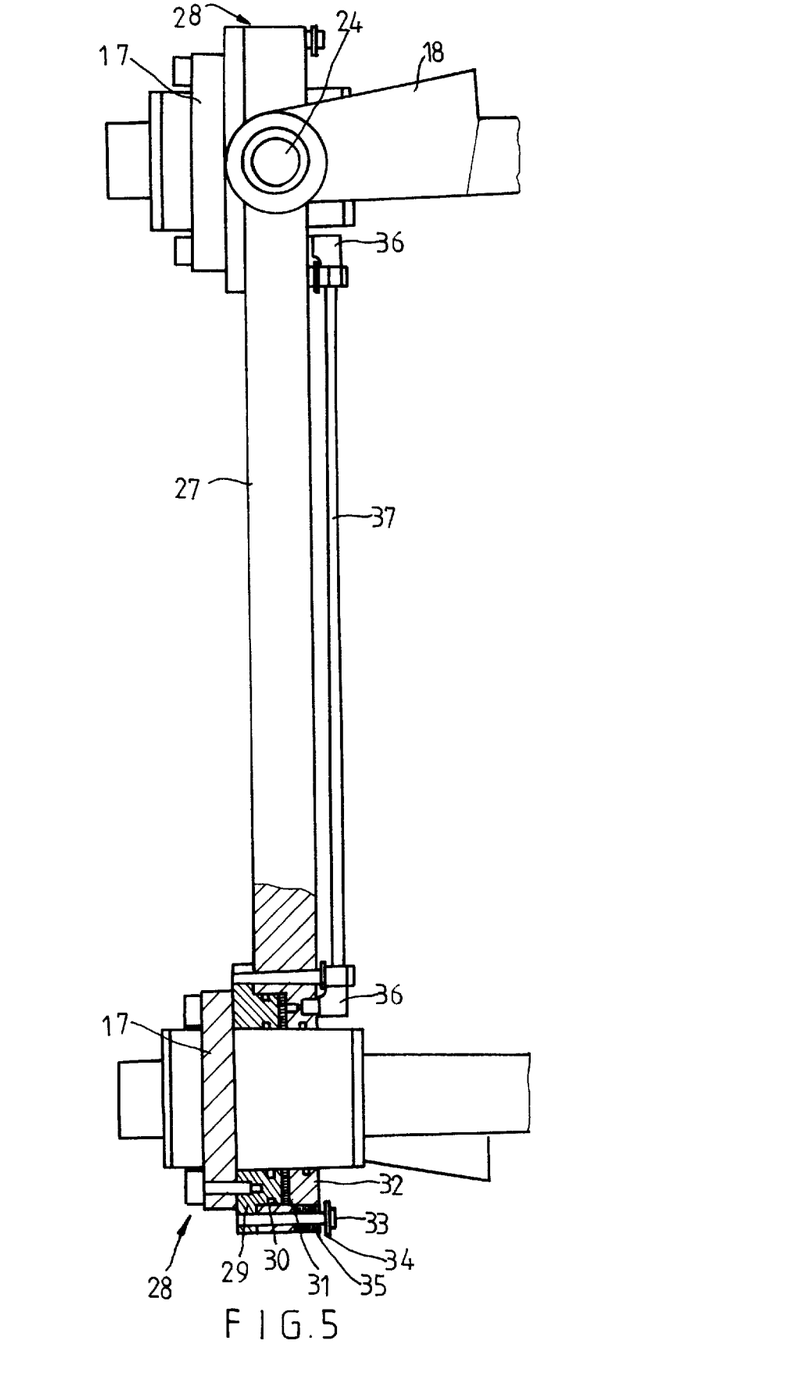
FIG. 5 is an enlarged view of a pre-load hydraulic cylinder of the clamping unit according to the present invention.
Figure 7:
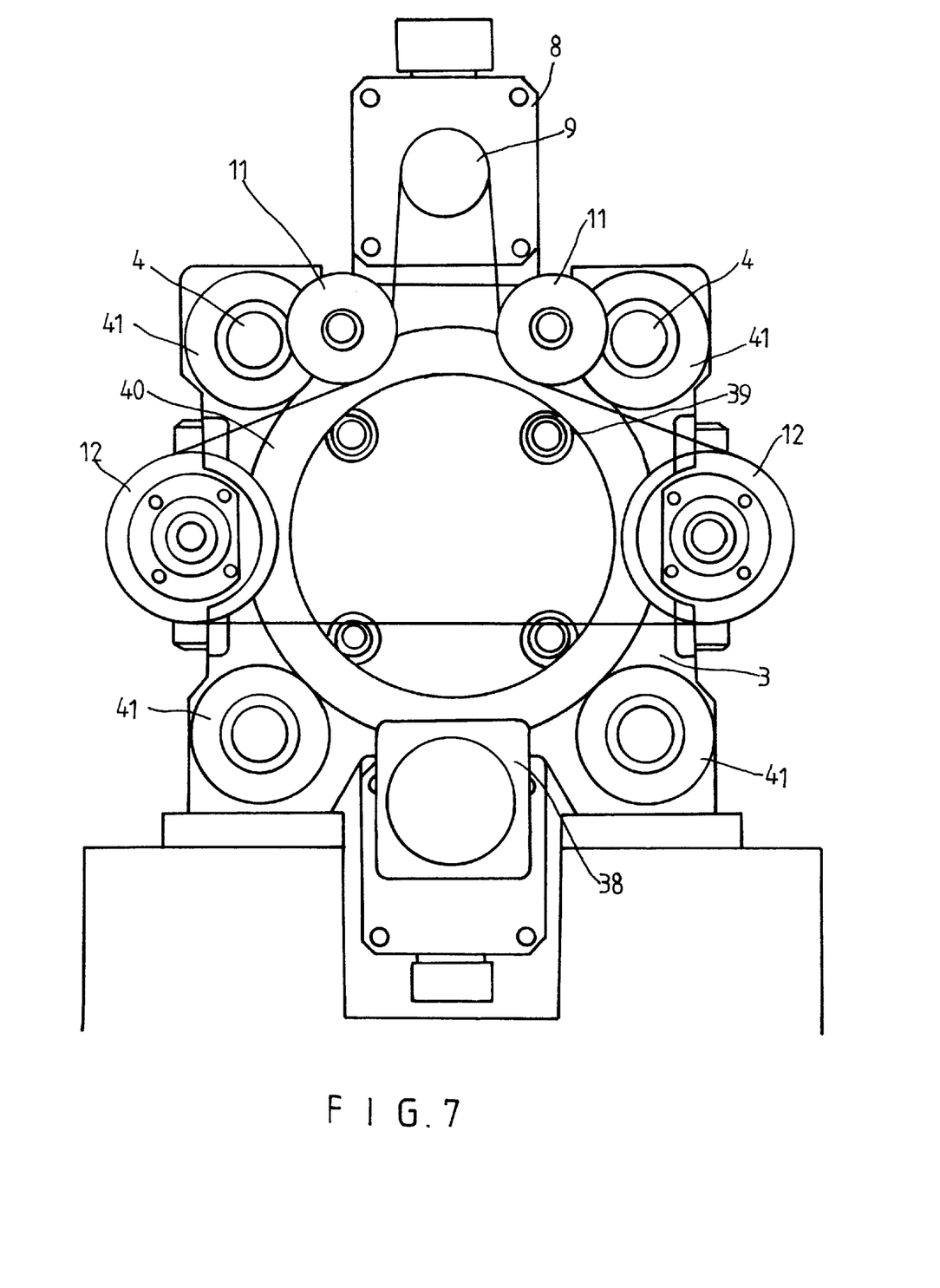
FIG. 7 is a left side view of the clamping unit according to the present invention.

Referring to FIGS. 4-1 and 4-2, the clamping unit according to the present invention is shown with the mold-opening view and a mold-clamping view. The clamping unit of the present invention comprises a machine base 1 (as shown in FIGS. 6-1 and 6-2), a front platen 2, a rear platen 3, two pairs of tie bars 4 arranged parallel to each other and fixedly mounted at four end corners of the device respectively, a sliding block 5 and a movable platen 6. The movable platen 6 and the rear platen 3 are coupled together by means of an outward-bending toggle mechanism 7, which is driven to move by using a servo-motor 8 mounted on the rear platen 3. The motor drives the outward-bending toggle mechanism 7 to move through a driver mounted on the shaft of the motor, a timing belt 10, an idler 11, a follower 12 (as shown in FIG. 7), a ball screw 16 supported with a bearing 13, a bearing cover 14, and a partition ring 15. The ball screw 16 can drive a nut 17 to move straight along the ball screw 16 so as to provide power for the 4-point toggle linkage. In the present invention, a servo-motor 8 is used for driving the ball screw and the nut to provide a better positioning accuracy aside from simplifying the assembling and maintenance requirements. The 4-point toggle linkage includes a driving arm 18 connected with a pushing plate 27, a rear-platen arm 19 fixedly mounted in the front side of the rear platen 3, a rear arm 20, a front arm 21, a movable-platen arm 22 mounted to the movable platen 6, and four shaft pins 23, 24, 25 and 26 with oil-less bearings. In order to reduce the load of the ball screw, and to provide a balanced clamping force, two ball screws 16 are used in the present invention. For the purpose of surely obtaining the aforesaid functions, the force applied to the two ball screws has to be equal, and the pitch error between the two ball screws 16 and an unavoidable impact upon mold-opening can be absorbed. Therefore, two sealed and inter-communicating pre-load hydraulic cylinders 28 are installed between the nut 17 and the pushing plate 27, being used as buffers. FIG. 5 illustrates the enlarged view of the pre-load hydraulic cylinders 28, each of which each includes a piston 29, a seal 30, a high-pressure-resistant fluid 31, and two cover plates 32 mounted on both ends of the pushing plate 27. The pre-load hydraulic cylinder 28 is fastened together with a piston 29 by means of a screw 33, a washer 34 and a spring 35. Pipe joints 36 and a pipe 37 are used for maintaining the two pre-load hydraulic cylinders 28 in a balanced pressure condition. In the present invention, the outward-bending toggle mechanism 7 is actuated by two ball screws 16 so as to reduce the load usually applied to a single ball screw. In order to have a balanced force to apply to the two ball screws, and to absorb the screw pitch error between the two ball screws, and to absorb an impact which is unavoidable during mold-opening or mold-locking, two sealed and inter-communicating pre-load hydraulic cylinders 28 are installed between the nut 17 and the pushing plate 27, being used as a buffers.

Instead of a conventional hydraulic motor, an electric motor is used in the present invention; the electric motor is a mold-adjusting motor 38 mounted on the rear platen 3 for driving a ring-shaped gear 40, which are supported by several rollers 39; such gear 40 is coupled with several nut gears 41, which can drive the rear platen 3 to move back and forth; the mold can be adjusted quickly by means of a servo-motor encoder and a current sensor (not shown).

Figure 11:
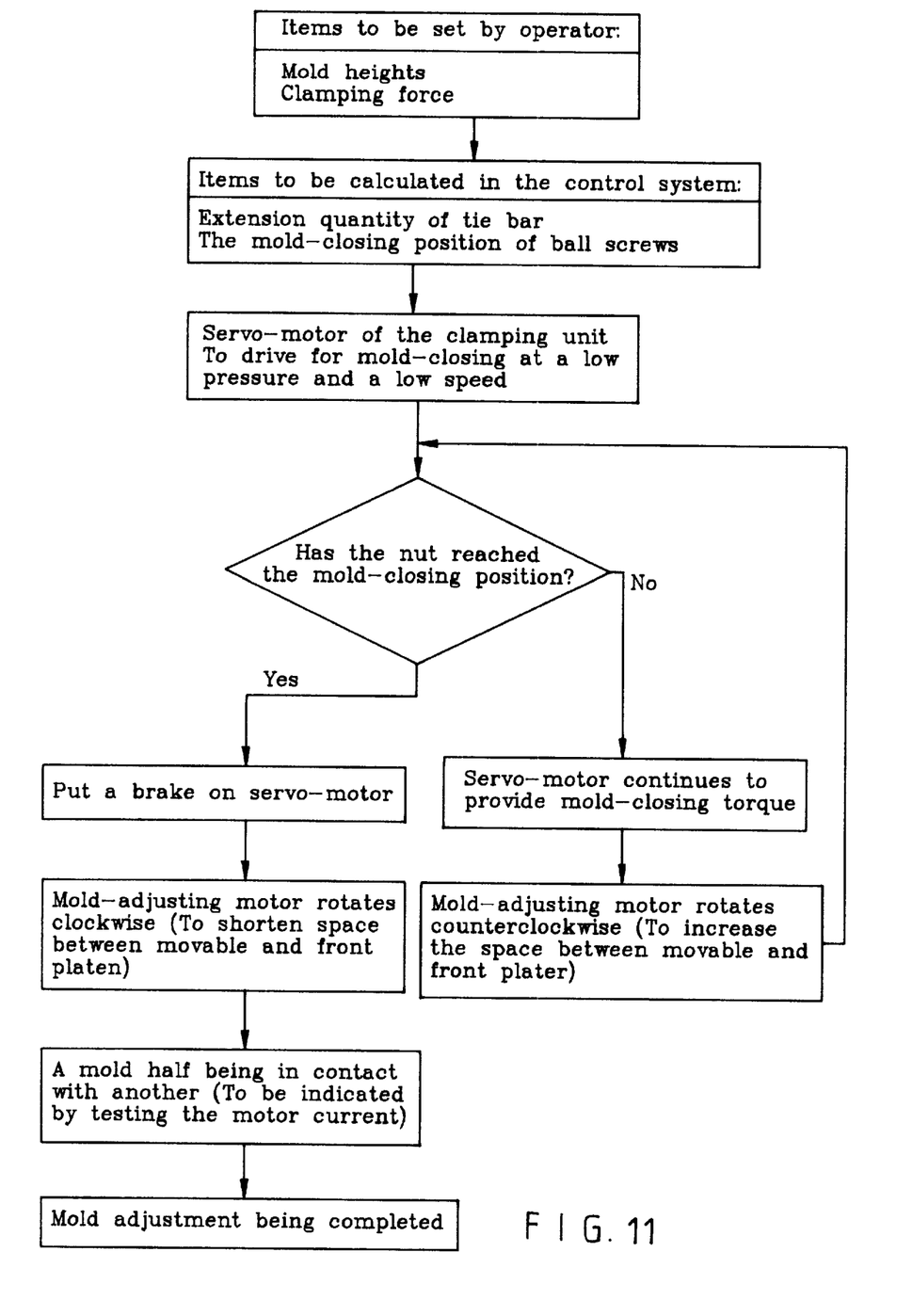
FIG. 11 is a flow chart, showing the procedures of the mold adjustment, and of setting the clamping force for the mold.

In the present invention, the mold-adjusting device can be adjusted quickly and automatically to set a clamping force by following the procedures (referring to FIG. 11): First, obtain the following factors with an equation, $$F = 4\frac{\delta_x AE}{L}$$

where: F=predetermined clamping force;
$\delta_x$=the extension distance of the tie bar;
E=Young's modulus;
A=the cross-section area of the tie bar;
L=the length of the tie bar.

$$\delta_x = \frac{FL}{4AE}$$

Referring to FIG. 11, the clamping force F and the mold heights should be obtained so as to convert them into the extension of the tie bar δx of the tie bar 4 as shown in step 100; then the mold-closing position (the distance δm of the pair of nuts position) can be found by referring to the curve diagram between the nut 17 and the movable platen 6 as shown in step 101; then, the nut 17 can be driven by low torque and low speed till the mold-closing position as shown in step 102; the servo-motor 8 will make a positioning brake, and the mold-adjusting motor 38 will rotate clockwise till two mold halves contact each other as shown in step 106, 107, 108; in that case, the current in motor 38 will be increased drastically as a result of reaching a mechanical dead point, and then a signal from the current sensor will turn off the motor 38 and mold adjustment being completed as shown in step 109. In the event of the nut 17 being unable to reach the mold-closing position as shown in step 103, the encoder of servo-motor 8 would sense the condition to enable the servo-motor 8 to supply a low torsional force continuously as shown in step 104, and to have the mold-adjusting motor 38 turned counterclockwise as shown in step 105, i.e., both the mold-adjusting motor 38 and the servo-motor 8 rotate until the nut 17 reaches the mold-closing position; then, the mold-adjusting motor 38 and the servo-motor 8 will be braked simultaneously. Although the servo-motor 8 can provide an accurate control, two mold halves might not be in contact closely (because of the error caused by the mold-adjusting motor 38); in order to remove minor gap between the male mold and the female mold, the mold-adjusting motor 38 must rotate clockwise again; the current of the mold-adjusting mold is increased instantly to a set value, and then the mold-adjusting motor 38 is turned off to complete the mold adjustment by a signal of current sensor; in other words, as soon as the toggle linkage is set at straight condition (being sensed with a touch-limit switch), the tie bars 4 will be extended (the increment of its length is δx) so as to provide a clamping force F required and to complete the adjustment quickly.

The mold-closing position of the nut 17 and the movable platen 6 can be obtained by means of a theoretical method. The theoretical method is calculated the δm (the distance of the pair of nuts position).

Figure 15:
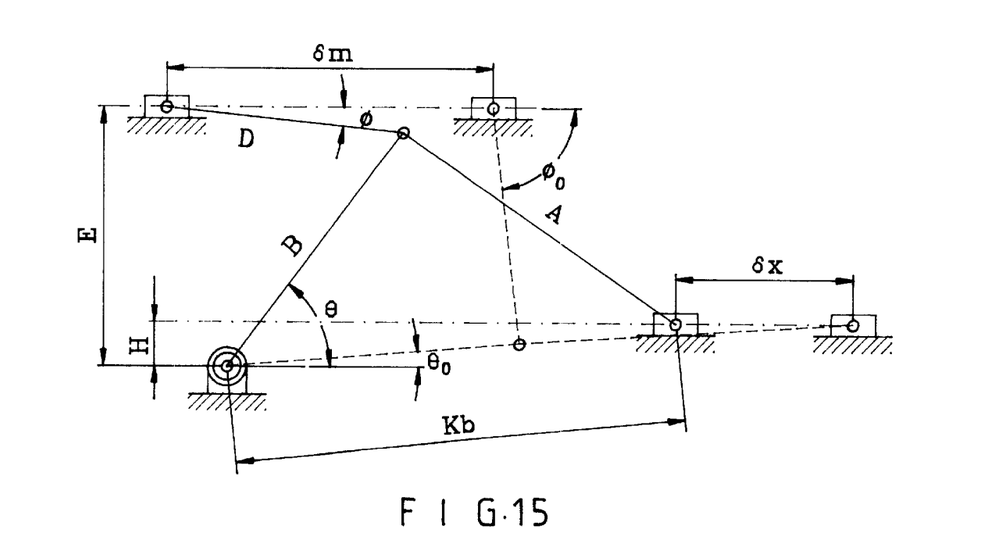
FIG. 15 is a schematic diagram of a toggle mechanism.
Figure 41:
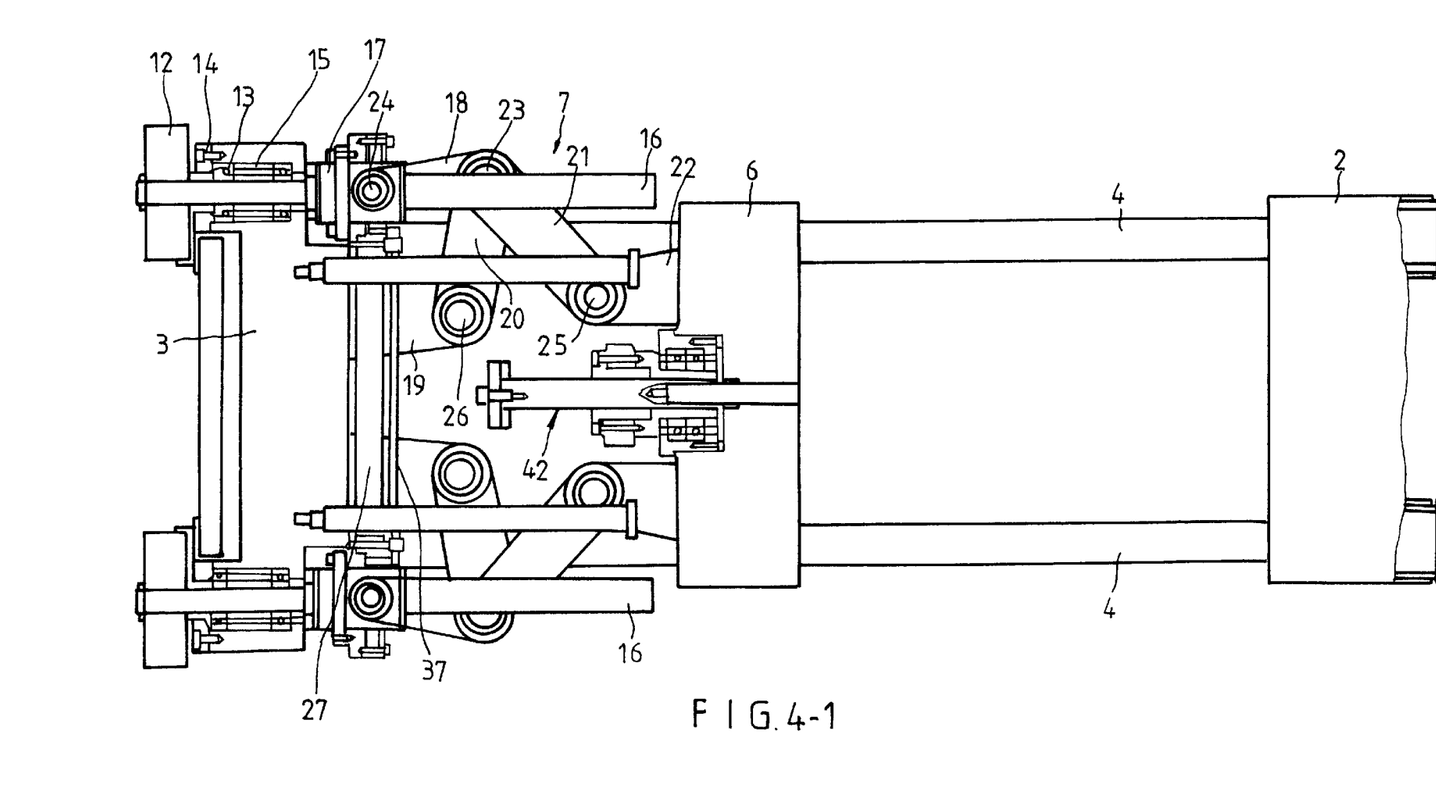
Figure 42:
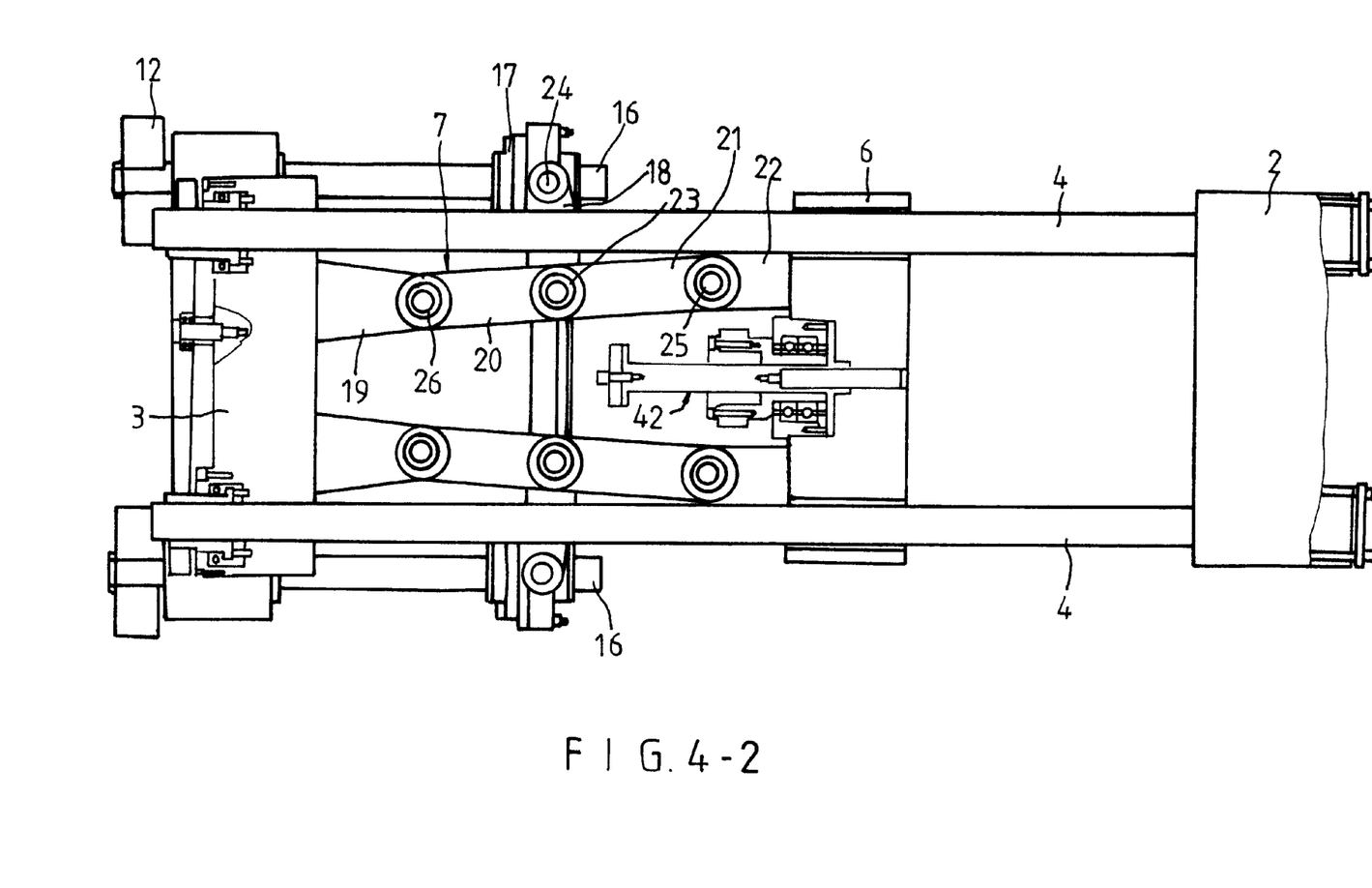
Figure 61:
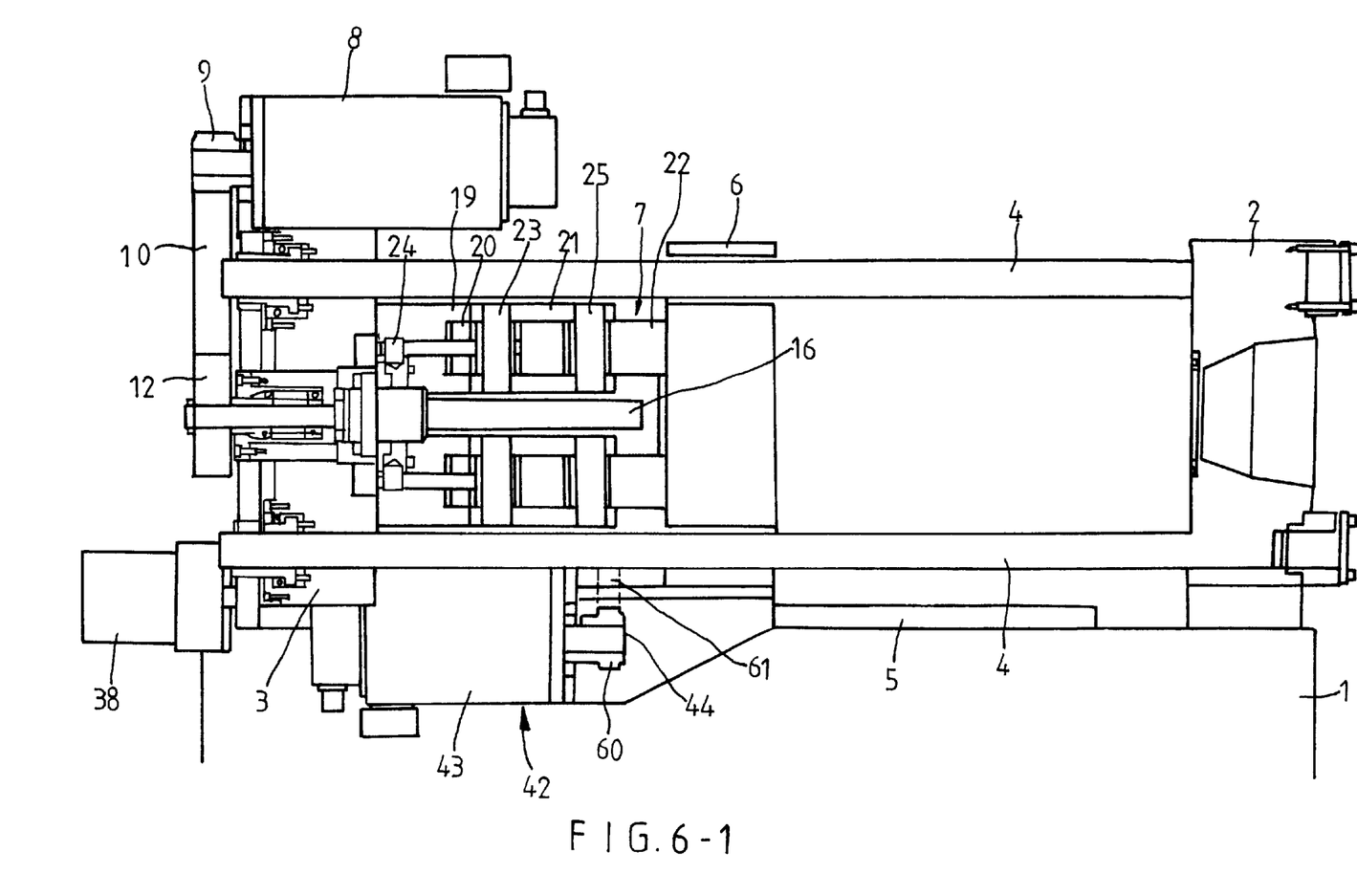
Figure 62:
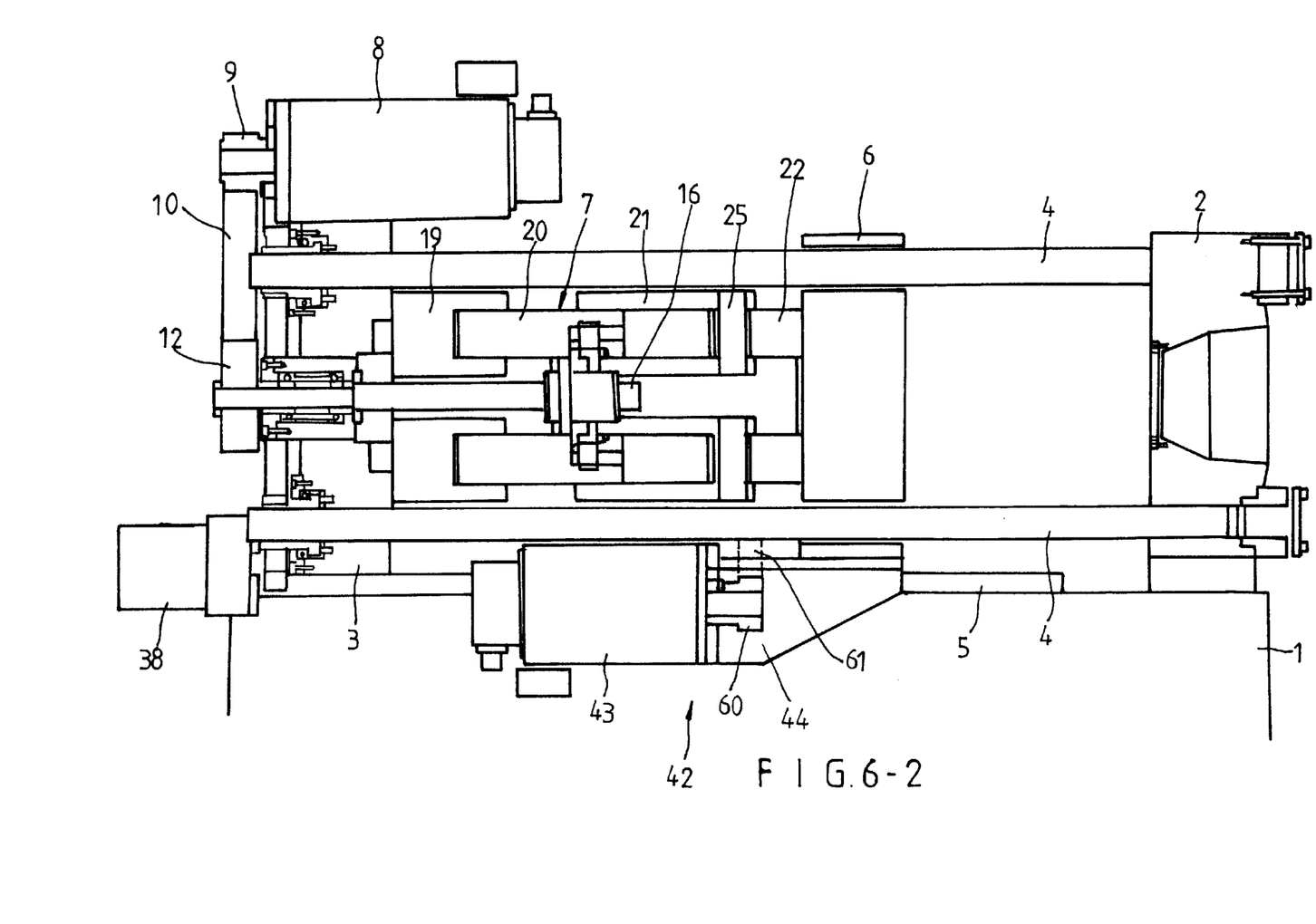

Referring to the FIG. 15 (brief drawing of toggle mechanism), the δm can be calculated as the following equation:

$$\delta m = B(\cos\theta_0 - \cos\theta) - D(\cos\varphi_0 - \cos\varphi),$$

$$\theta_0 = \sin^{-1}\left(\frac{H}{A+B}\right),$$

$$\varphi_0 = \sin^{-1}\left(\frac{E - B\sin\theta_0}{D}\right),$$

$$\delta = [(A+B)^2 - H^2]^{0.5} - \delta_x,$$

$$K_b = (\delta^2 + H^2)^{0.5},$$

$$\theta = \cos^{-1}[(B^2 + K_b^2 - A^2)/(2BK_b)] + \tan^{-1}(H/\delta),$$

$$\varphi = \sin^{-1}\left(\frac{E - B\sin\theta}{D}\right);$$

Figure 14:
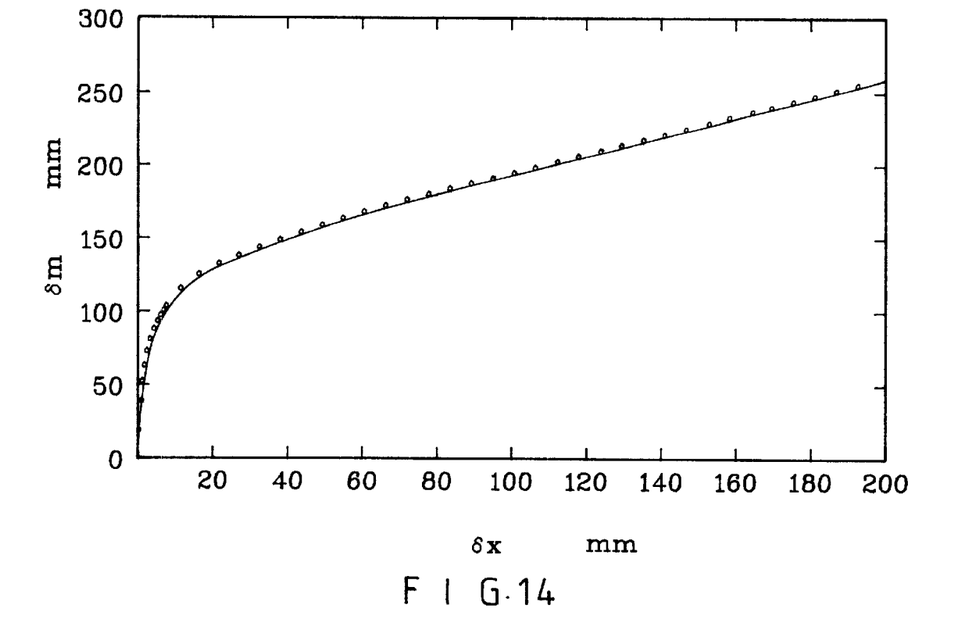
FIG. 14 is a curve diagram, showing the relation between the distance of the pair of nuts position δm and the extension distance of the tie bar δx.

Therefore, the curve diagram as shown in FIG. 14 can be formed by means of the theoretical method, i.e., being input a variety of data (δx) and then to obtain corresponding data (δm) according to the above equation.

Figure 8:
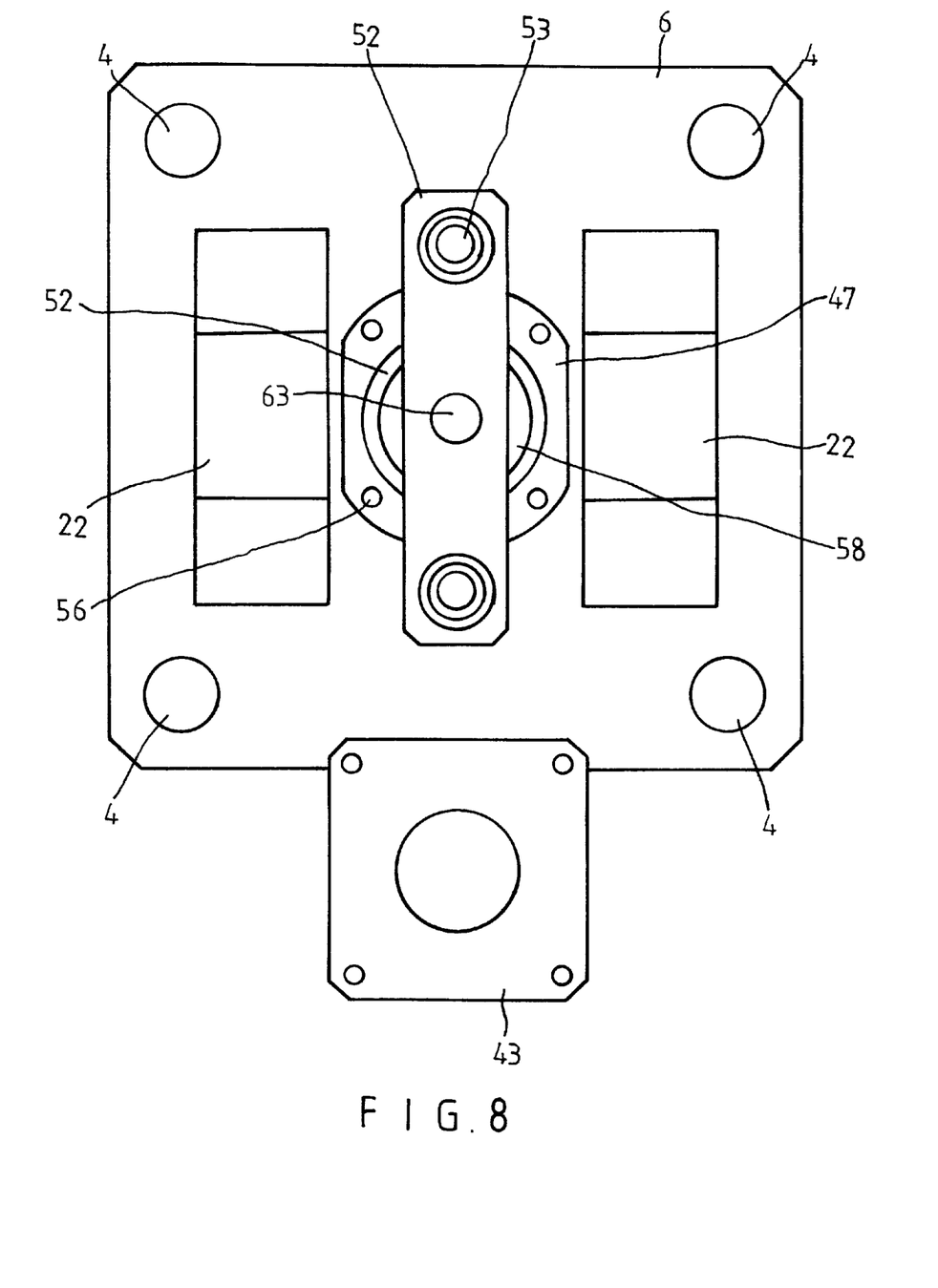
FIG. 8 is a left side view of an ejector device in the clamping unit according to the present invention.
Figure 9:
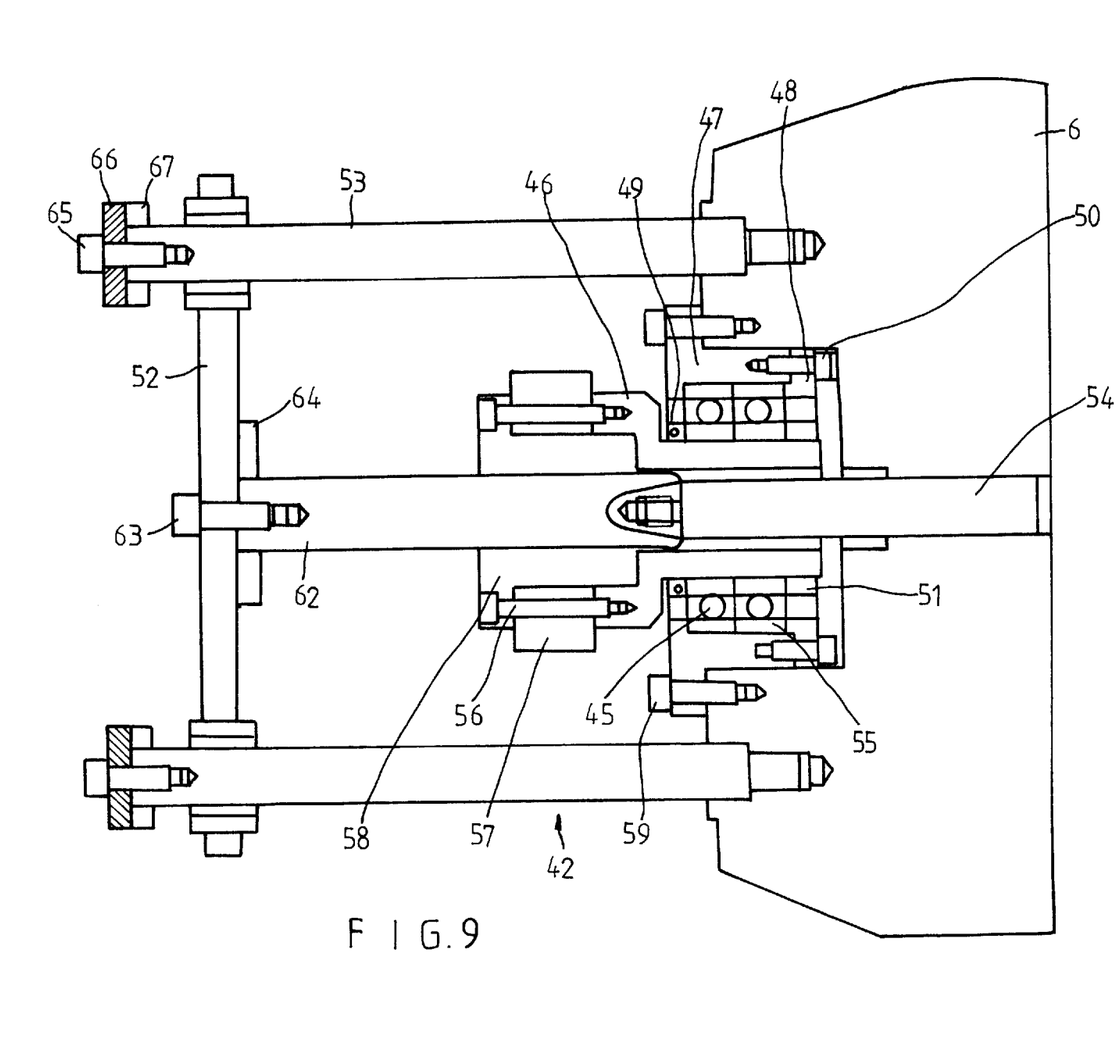
FIG. 9 is a front view of the ejector device in the clamping unit according to the present invention.
Figure 10:
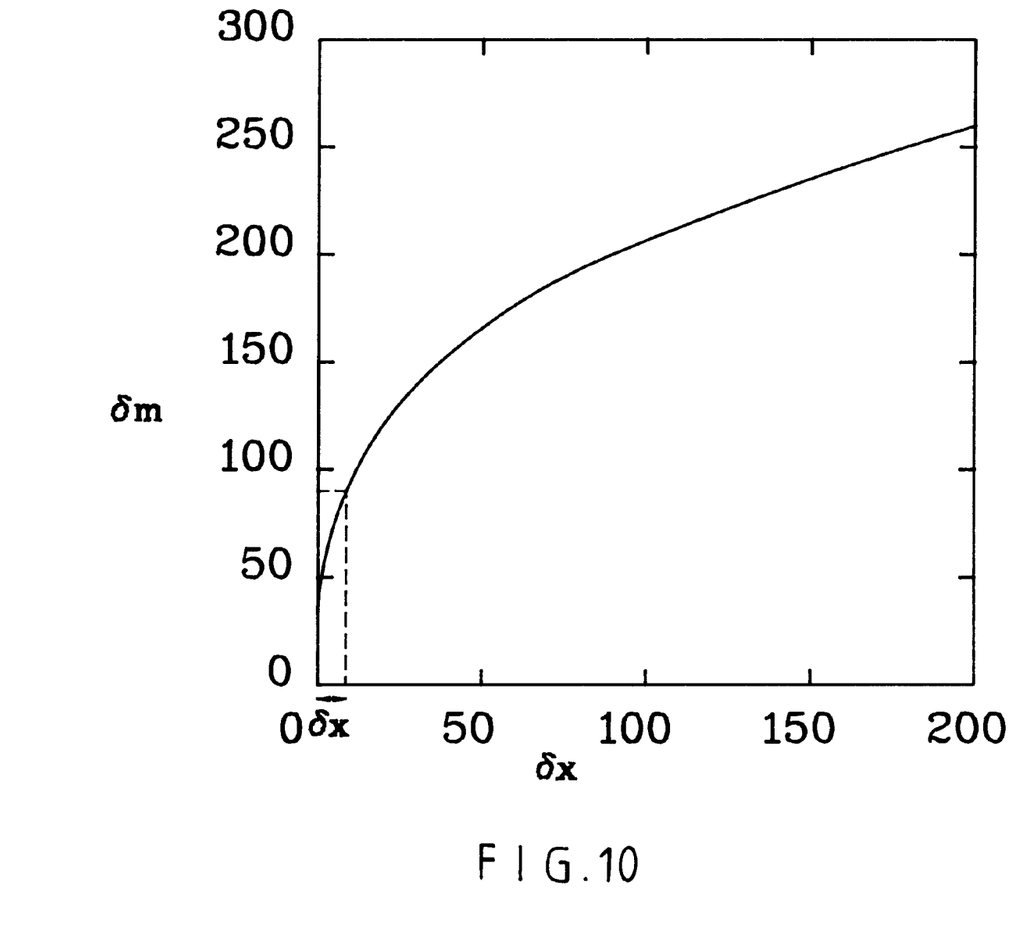
FIG. 10 is a curve diagram, showing the relative position between the nut and the movable plate according to the present invention.

An ejector device 42 as shown in FIGs. 8 and 9 in mounted between the double toggle mechanism 7 so as to use the space between the rear platen 3 and the movable platen 6, and to shorten the length of the clamping unit. The ejector device 42 includes a servo-motor 43, a transmission mechanism 44, two bearings 45 and 55, an inner bush 46 of the bearing, an outer bush 47 of the bearing, a bearing cover 48, a bearing washer 49, screws 50, bearing lock nuts 51, a guide plate 52, guide rods 53 and an ejector bar 54, A screw 56 is put through a nut 58, a follower 57 before being fastened in the inner bush 46. The outer bush 47 is fastened to the movable platen 6 with a screw 59. The ejector device is driven with the servo-motor 43 through a driver 60, a timing belt 61, a follower 57, a nut 58 and a ball screw 62 of the transmission mechanism 44. The ejector bar 54 moves back and forth along a straight line by means of a guide plate 52 and guide rods 53. The guide plate 52 is fastened together with the ball screw 62 with a screw 63. The guide plate 52 is mounted with a buffer-part 64. The rear end of the guide rod 53 is fastened with a stop plate 66 and a buffer-part 67 with screws 65.

In the present invention, a 4-point toggle linkage is used; the servo-motor 43 can drive the nut 58 to rotate, then the ball screw 62 and the ejector bar 54 can move in a straight line so that the clamping unit becomes as short as possible. Comparison between the present invention and the prior art is described as follows:

| | The present invention | Prior art |
|---|---|---|
| Technical Features | 1. The servo-motor drives two ball screws with pre-load hydraulic cylinder which will actuate the outward-bending toggle mechanism to perform the mold-opening and the mold-clamping functions. | 1. The servo-motor drives the ball screws without buffer device which will actuate the out-ward-bending toggle mechanism to perform mold-opening and the mold-clamping functions. |
| | 2. Fully utilizing a limit space to drive s servo-motor mounted on the movable platen to turn a nut so as to cause the ball screw and an ejector bar to move back and forth along a straight line. | 2. A servo-motor is used for rotating a ball screw so as to cause the nut and an ejector bar to move back and forth along a straight line; such a mechanism takes a larger apace. |
| | 3. Using an electric motor on the rear platen to drive the mold-adjusting mechanism; by means of the servo-motor on the platen, a mold can be adjusted quickly and automatically so as to set a clamping force. | 3. An electric motor on the rear platen is used to drive a mold-adjusting mechanism through a two-division method and a trial-and-error method; by means of a sensor mounted on the platen, the mold can be adjusted automatically, and a clamping force can be set. |
| Results Obtained | 1. Having a balanced clamping force, and a better positioning function. | 1. Having an unbalanced clamping force, and larger load for the ball screws. |
| | 2. Space being used effectively, and the mechanism being arranged easily. | 2. Having limited space, which causes difficulty in maintenance. |
| | 3. The mold precision can be maintained; the product quality control can be elevated steadily. | 3. The mold precision is subject to change, and the product quality is unstable. |
| | 4. The speed of the mechanism can be controlled. effectively so as to provide a smooth operation. | 4. The mechanism without buffer would have unavoidable vibration causing some damage to the parts thereof. |

Furthermore, the present invention can be also applied to the following items:

a. Using one servo-motor to drive one ball screw for driving the toggle mechanism.

b. Using two servo-motors to drive two ball screws respectively (having different screw pitch) so as to provide a quick and slow mold-locking function in the mold-clamping assemble.

c. Chain and gear can be employed to transmit the power in order to actuate the mold-adjusting mechanism.

What is claimed is:

1. A method of producing an object using injection molding machine, comprising the following steps:

(a) providing an injection molding machine having a clamping unit, said clamping unit comprising:

(i) a machine base;

(ii) a front platen mounted on said machine base; and (iii) a plurality of tie bars parallel to each other and fixedly mounted to said front platen; a rear platen and a movable platen both of which are also mounted on said machine base, said movable platen being movable sleeved about said tie bars, and said rear platen and said movable platen being coupled together by a pair of outward-bending toggle mechanisms;

(b) placing a mold in which an object is to be made inside said clamping unit;

(c) using a servo-motor mounted on said rear platen to actuate a plurality of ball screws, said ball screws being adapted to drive said outward-bending toggle mechanism via a balancing means so as to perform mold-opening and mold-claming functions; wherein said balancing means including a plurality of sealed and intercommunicating pre-load hydrolic cylinders which are able to apply a balanced force to said ball screws so as to provide a balanced clamping force, to minimize a screw pitch error between said ball screws and to absorb an impact during mold opening;

(d) determining a clampind force required to operate said clamping unit;

(e) using said ball screw to set said clamping force so as to operate said clamping unit;

(f) injecting an injectable material into said mold to form an object.

2. The method of producing an object using an injection molding machine according to claim 1, wherein:

(a) said outward-bending toggle mechanism comprises a driving arm, a front arm, a rear arm, a rear-platen arm, and a movable-platen arm;

(b) said rear-platen arm is fixedly connected to said rear platen, and said movable-platen arm is fixedly connected to said movable platen;

(c) said front arm, said rear arm and said driving arm are commonly and privotably connected via a first pin;

(d) said driving arm is pivotably connected to said rear platen via a second pin;

(e) said rear arm is pivotably connected to said rear-platen arm via a third pin; and (f) said front arm is pivotably connected to said movable-platen arm via a fourth pin.

3. The method of producing an object using an injection molding machine according to claim 2, wherein said clamping force is provided according to the following steps:

(a) calculating an extension distance of said tie bars according to the following formula:

$$\delta_x = \frac{FL}{4AE}$$

wherein F is the predetermined clamping force, $\delta_x$ is the extension distance of the tie bar, E is Young's modulus, A is the cross-sectional area of the tie bar, L is the length of the tie bar; and (b) adjusting a distance between said movable platen and said rear platen a distance $\delta_m$ according to the following set of formulas:

$$\delta m = B(\cos\theta_0 - \cos\theta) - D(\cos\varphi_0 - \cos\varphi),$$

$$\theta_0 = \sin^{-1}\left(\frac{H}{A+B}\right),$$

$$\varphi_0 = \sin^{-1}\left(\frac{E - B\sin\theta_0}{D}\right),$$

$$\delta = [(A+B)^2 - H^2]^{0.5} - \delta_x,$$

$$K_b = (\delta^2 + H^2)^{0.5},$$

$$\theta = \cos^{-1}[(B^2 + K_b^2 - A^2)/(2BK_b)] + \tan^{-1}(H/\delta),$$

$$\varphi = \sin^{-1}\left(\frac{E - B\sin\theta}{D}\right);$$

wherein A is the length of the front arm,

B is the length of the rear arm,

D is the length of the driving arm,

E is the axial distance between the second shaft pin and the third shaft pin,

H is the axial distance between the second shaft pin and the fourth shaft pin, $\delta_x$ is the extension distance of the tie bar, $\delta$ is a parameter for calculating $\theta$, $\phi$ is the angle between the driving arm and ball screw, $\theta$ is the angle between the rear arm and a vertical line passing through the third shaft pin, $\psi_0$ is the angle between the front arm and the ball screw, $\theta_0$ is the angle between the line connecting said third and fourth shaft pins and a vertical line passing through the third shaft pin, $K_b$ is the distance between shaft pin and shaft pin.

* * * * *